United States Patent [19]
Reiker

[11] Patent Number: 6,096,974
[45] Date of Patent: *Aug. 1, 2000

[54] MOUNTING ASSEMBLY FOR SUPPORTING A DEPENDING FIXTURE

[76] Inventor: Kenneth H. Reiker, 269 Country Club Dr., Shalimar, Fla. 32579

[ * ] Notice: This patent is subject to a terminal disclaimer.

[21] Appl. No.: 09/326,171

[22] Filed: Jun. 4, 1999

Related U.S. Application Data

[63] Continuation of application No. 08/905,142, Aug. 1, 1997
[60] Provisional application No. 60/023,060, Aug. 2, 1996.

[51] Int. Cl.$^7$ ........................................................ H02B 1/48
[52] U.S. Cl. .............................. 174/62; 220/3.3; 220/3.9; 248/906; 248/205.3
[58] Field of Search ................................. 174/59, 60, 61, 174/62, 53, 57, 50, 51; 220/3.2, 3.3, 3.8, 3.9; 248/906, 205.3

[56] References Cited

U.S. PATENT DOCUMENTS

| | | | |
|---|---|---|---|
| 1,004,946 | 10/1911 | Wares et al. ......................... | 220/3.8 X |
| 1,040,175 | 10/1912 | Earhart ...................................... | 174/62 |
| 1,798,838 | 3/1931 | Garvin ................................ | 248/906 X |
| 3,616,096 | 10/1971 | Roeder ............................. | 248/205.3 X |
| 4,050,603 | 9/1977 | Harris et al. ............................. | 220/3.9 |
| 4,082,915 | 4/1978 | Silver .................................... | 174/53 X |
| 4,275,862 | 6/1981 | Takagi et al. ........................ | 248/205 A |
| 4,424,406 | 1/1984 | Slater et al. .......................... | 174/65 R |
| 4,892,211 | 1/1990 | Jorgensen ............................ | 248/906 X |
| 4,909,405 | 3/1990 | Kerr, Jr. .................................... | 220/3.9 |
| 5,303,894 | 4/1994 | Deschamps et al. ............... | 248/906 X |
| 5,677,512 | 10/1997 | Reiker ....................................... | 174/58 |
| 5,860,548 | 1/1999 | Kerr, Jr. .................................. | 220/3.2 |

FOREIGN PATENT DOCUMENTS

| | | |
|---|---|---|
| 2436518 | 5/1980 | France . |
| 1309950 | 3/1973 | United Kingdom . |

*Primary Examiner*—Dean A. Reichard
*Attorney, Agent, or Firm*—Cahill, Sutton & Thomas P.L.C.

[57] ABSTRACT

An electrical mounting assembly includes a box having a top wall and a side wall. The side wall extends downwardly away from the top wall and defines a cavity therein. A dimpled hole is provided in the top wall, and a supplemental fixture support extends into the dimpled hole for engaging at least a portion of the walls thereof. A threaded hole may be provided on the supplemental fixture support. The supplemental fixture support may be a rivet. A rough surface or fluting may be provided on a portion of the supplemental fixture support for engaging the walls of the dimpled hole. Preferably, the supplemental fixture support has exposed portions which are sufficiently smooth for preventing wear to plastic-coated electrical wire which engages such exposed surfaces of the supplemental fixture support.

22 Claims, 4 Drawing Sheets

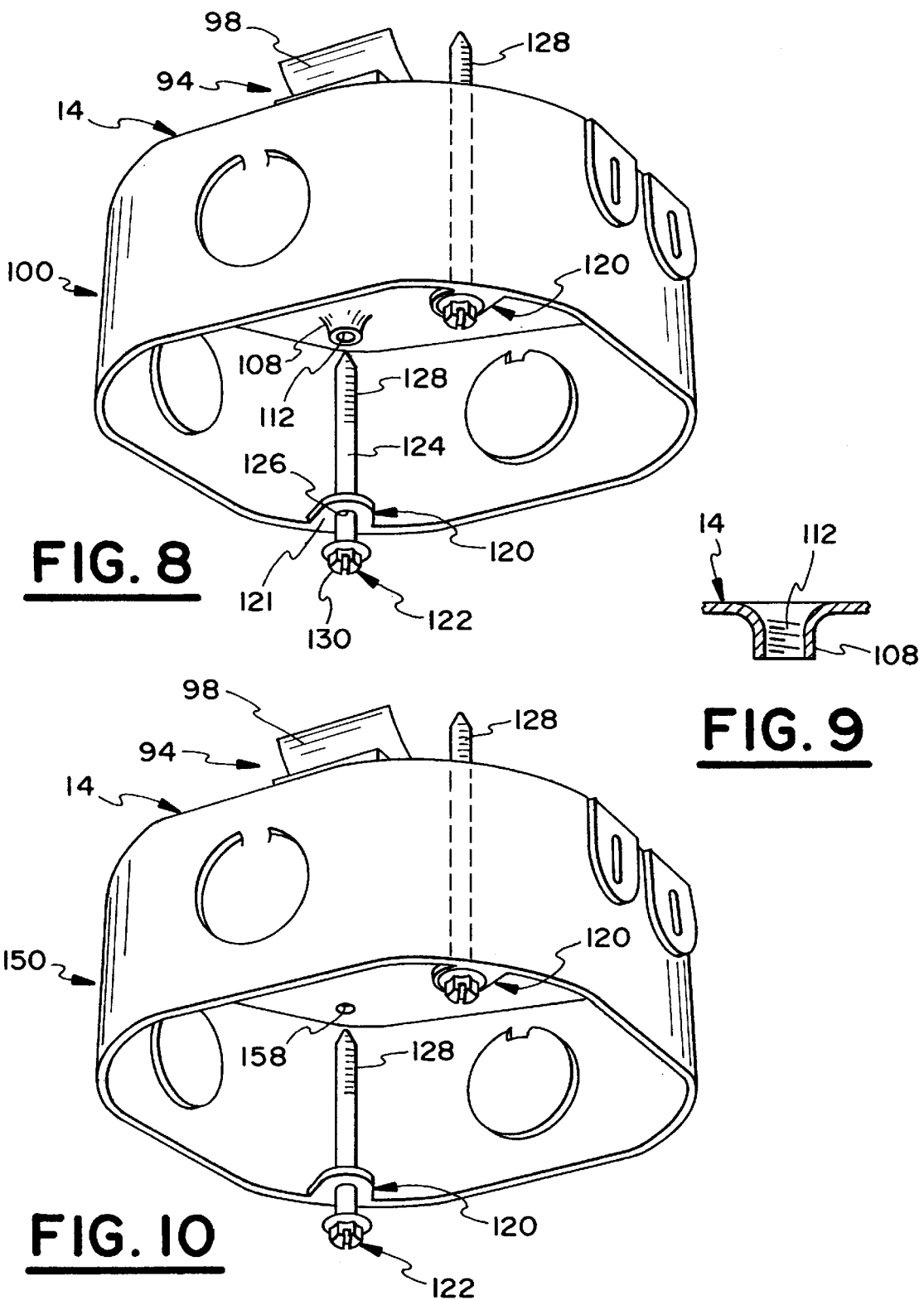

MOUNTING ASSEMBLY FOR SUPPORTING A DEPENDING FIXTURE

CROSS-REFERENCE TO RELATED APPLICATIONS

This application is a continuation of application Ser. No. 08/905,142, filed Aug. 1, 1997, entitled "ELECTRICAL BOX WITH DIMPLED HOLE AND SUPPORT FOR CRYING FIXTURES", which application claims priority of application Ser. No. 08/862,378, filed May 23, 1997, and application Ser. No. 08/862,379, filed May 23, 1997, and application Ser. No. 60/023,060, filed Aug. 2, 1996, and application Ser. No. 08/490,757, filed Jun. 15, 1995, and application Ser. No. 08/371,695, filed Jan. 12, 1995, each of which is incorporated herein by reference; and this application relates to application Ser. No. 08/862,380, filed May 23, 1997, entitled "Electrical Box With Auxiliary Supports for Carrying Fixtures".

FIELD OF THE INVENTION

The present invention relates to electrical boxes and methods of producing the same.

BACKGROUND OF THE INVENTION

Consumers, updated National Electrical Codes (NEC), and Underwriter Laboratories (UL) requirements all require that electrical boxes be made stronger than in the prior art.

OBJECTS AND SUMMARY OF THE INVENTION

An object of the invention is to overcome the drawbacks of known electrical boxes.

A further object of the invention includes making electrical boxes which use the standard punched-out, stamped electrical boxes in a more intelligent fashion.

Yet another object of the invention is to provide a standard industry size electrical box with a supplemental support for supporting a fixture, and that is located the proper distance from a second supplemental support, and meets National Electrical Code (NEC) standards.

Another object of the invention is to fully exploit the strength of fixture support studs, the top wall, and the side walls of electrical boxes.

Another object of the invention is to achieve a strengthened electrical box with a supplemental support within a standard so-called "4×4" box, while maintaining the near universal 3.5 inch (8.9 cm) spacing between the fixture supports so that the box is usable with standard light fixtures, ceiling fans, and the like.

It is likewise an object of the invention to provide supplemental metal inserts in and/or on the electrical boxes to enhance the carrying strength of the electrical boxes.

A further object of the invention is to provide studs in the electrical boxes that strengthen the electrical boxes.

Yet another object of the invention is to provide studs in the electrical boxes which cover the threads of standard screws so that no screw threads are present in the interior of such electrical boxes.

A still further object of the invention is to provide an electrical box having a supplemental support with a sufficiently smooth exterior for preventing wear to the plastic coating of plastic-coated electrical wire.

It is yet another object of the invention to provide electrical boxes in which added supports, such as studs, are added during the manufacturing process to eliminate problems in prior art electrical boxes, as well as to strengthen the inventive electrical boxes.

Another object of the invention is to provide a junction box having a supplemental support, yet which requires no screwing of fasteners nor welding during assembly thereof.

Yet another object of the invention is to provide an electrical box having components which are easily fabricated, added to the electrical box, and assembled in the final form by the operation of pressing or riveting, yet which do not loosen when subjected to static and/or dynamic loading.

Another object of the invention is to provide a junction box engineered and configured so that a single fixture support/junction box support combination fastener can carry both an electrical fixture and the junction box, as well as attach the junction box to a support.

A still further object of the invention is to provide a junction box in which the supplemental support for carrying static and dynamic loads automatically extends in the desired direction along the side walls of the junction box during assembly and/or in use thanks to the use of a dimpled hole in the top wall thereof and/or thanks to the auxiliary support being configured for engaging the dimpled hole when the auxiliary support is attached and located in its attached, final form ready for use.

A still further object of the invention is to provide a junction box capable of carrying static and/or dynamic loads that has an auxiliary support and that is assembled with fewer parts and with fewer steps than known devices.

It is a yet further object that all the above be carried out with an electrical box which carries the load of supported static and dynamic fixtures better than known electrical boxes.

In summary, the present invention is directed to an electrical junction box or mounting assembly which includes a box having a top wall and a side wall. The side wall extends downwardly away from the top wall and defines a cavity therein. A supplemental fixture support is disposed in the cavity. A dimpled hole is provided in the top wall, and the supplemental fixture support extends into the dimpled hole for engaging at least a portion of the walls thereof. A threaded hole may be provided on the supplemental fixture support. The supplemental fixture support may be a rivet. A rough surface or fluting may be provided on a portion of said support for engaging the walls of the dimpled hole. Preferably, the supplemental fixture support has exposed portions which are sufficiently smooth for preventing wear to plastic-coated electrical wire which engages such exposed surfaces of the fixture support.

These objects and advantages as well as others will be readily apparent from a review of the following description and drawings.

The drawings show a variety of embodiments of the invention, as will be clear from reading the description below.

It is important to note that the use of relative terms such as "up" and "down", and "left" and "right" is for convenience only and is not intended to be limiting.

BRIEF DESCRIPTION OF THE DRAWINGS

FIG. 8 is a perspective view of a further preferred embodiment of a junction box according to the invention;

FIG. 9 is an enlarged view of the threaded dimple of FIG. 8; and

FIG. 10 is a perspective view, similar to FIG. 8 of yet another preferred embodiment of a junction box according to the invention.

DESCRIPTION OF THE PRIOR ART

Figure 1:
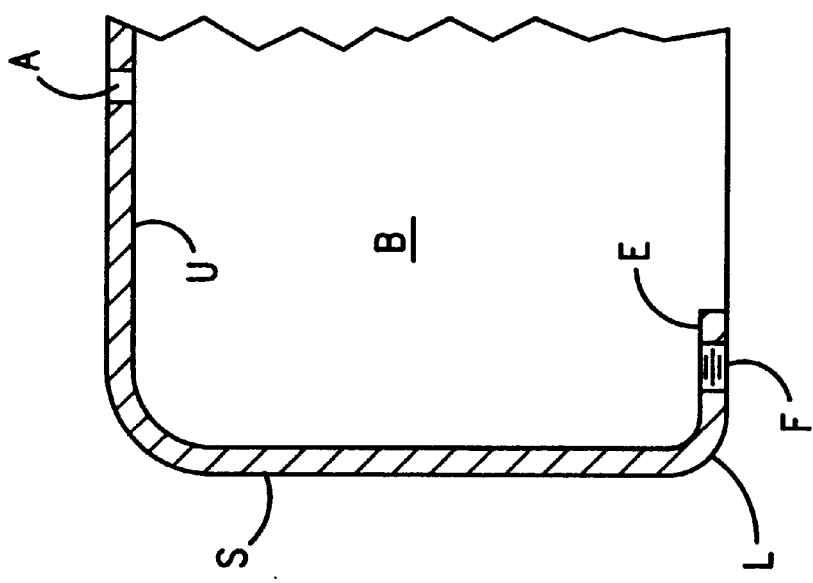
FIG. 1 is a cross sectional view of a PRIOR ART electrical junction box having an inwardly extending ear E with a faceplate plate attachment hole F provided therein.

FIG. 1 shows a PRIOR ART junction box including a side wall S, an upper wall U, and an ear E extending from a lower portion L thereof.

Upper wall U has one or more attachment holes A through which fasteners will be inserted for attaching PRIOR ART electrical box B to an overhead surface, such as to a ceiling joist or piece of plywood extending therebetween.

A lower, faceplate attachment hole F is typically provided in inwardly extending ear E. Frequently, faceplate hole F is provided with threads for mating with respective faceplate fasteners when securing an unillustrated faceplate thereto. Such faceplates are used to enclose electrical box B after the wiring inside the electrical box/junction box B has been completed.

A drawback of such PRIOR ART electrical boxes E is that they are typically made with stamped sheet metal extensions E; consequently, extensions E are relatively thin (i.e., in the order of about 1 millimeter or less). Such extension or ear E has a width of only a few millimeters, and only extends several millimeters inside box B. Thus, the surface area of ear E, when viewed from below after installation of upper wall U against a typical horizontal ceiling, is often substantially less than one centimeter squared (1 cm$^2$).

Consequently, ear E may only carry relatively small vertical loads, when installed against the ceiling, as described above.

As a result, local codes frequently allow such PRIOR ART boxes B to be used only for supporting the weight of a faceplate, or of a relatively light static or dynamic load, such as a light fixture or fan weighing 35 lbs. or less.

Such electrical boxes B are unsuited for supporting large static loads, as well as for supporting large dynamic loads, such as ceiling fans which may weigh fifty-five pounds (55 lbs.)/twenty-five kilograms or more (25 kg).

Thus, there is a need for an electrical box which is suited for carrying relatively large static loads as well as dynamic loads.

That need is especially clear, given that many homeowners want to install heavier light fixtures and dynamic loads, such as ceiling fans, than had exhibited such preferences in the past.

Furthermore, even if the initial owner/builder of a house or commercial space provides PRIOR ART load-carrying junction boxes B suited for carrying the vertical force of a small light fixture, a subsequent owner/user will often replace the original light fixture with a heavier light fixture, or with a dynamic load; i.e. a ceiling fan.

Accordingly, there is a need for a load-carrying junction box which is suited for a wide range of static and dynamic loads and, thus, suited for original installation in new construction, given that some users fail to upgrade load-carrying junction boxes when adding heavier static and/or dynamic loads to the box.

The electrical box according to the invention has overcome these drawbacks described immediately above, and has achieved the objects of the invention detailed above. Such will be evident when reading the following detailed description of the invention.

DETAILED DESCRIPTION OF THE INVENTION

Figure 2:
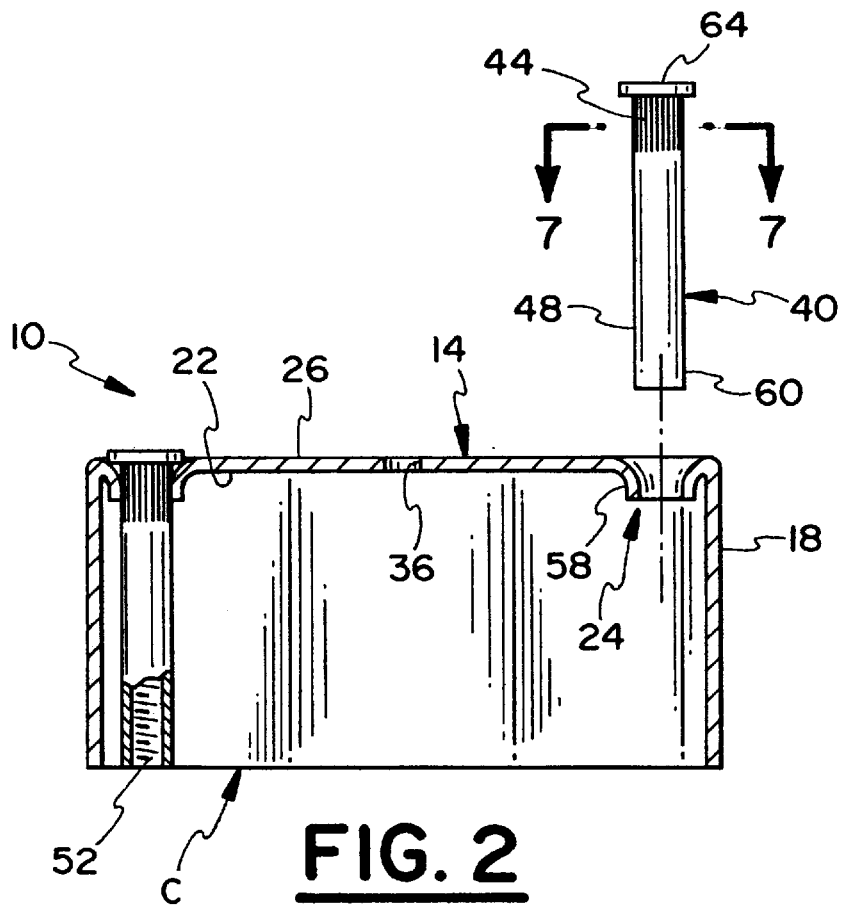
FIG. 2 is a cross-sectional view of a preferred embodiment of an electrical junction box according to the invention having dimpled punchouts in a top wall thereof, with the addition of a supplemental support, and with a supplemental support not yet installed.
Figure 3:
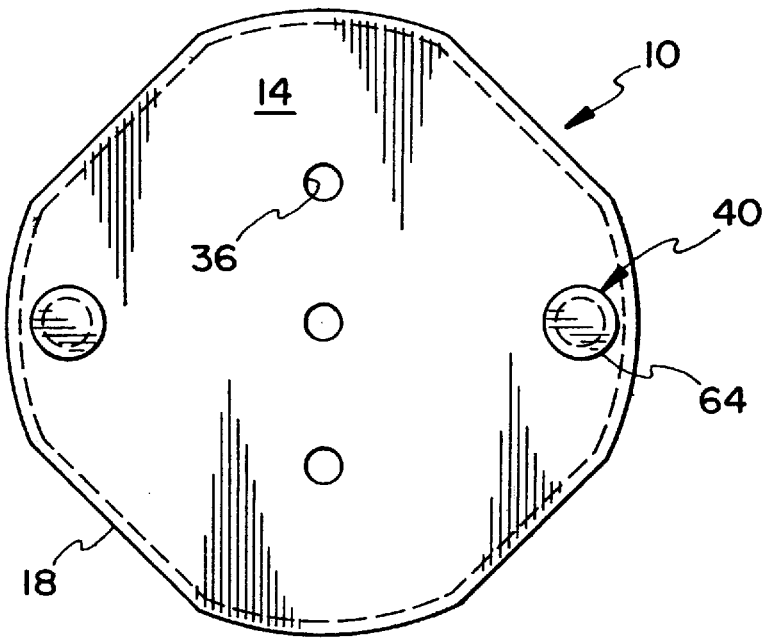
FIG. 3 is a top plan view of FIG. 2.

Turning to FIGS. 2 and 3, a first preferred embodiment of an electrical box and/or junction box 10 according to the invention will now be described in detail.

Junction box 10 includes a top wall 14, and a side wall 18 extending downwardly therefrom and defining a cavity C therein. Side wall 18 includes a lower free edge 20, and top wall 14 includes a lower face 22 and an upper face 26.

Preferably, one or more dimpled holes 24 are provided on top wall 14, for example.

Additional holes 36 for receiving portions of an electrical fixture, for example, and/or for fasteners which secure junction box 10 to a ceiling, for example, may likewise be provided.

FIG. 2 illustrates a supplemental support 40 which may be provided for increasing the holding strength of junction box 10. Support 40 on the left of FIG. 2 is installed, and the other support 40 is shown as it will typically be installed by downward insertion through top wall 14.

Supplemental support 40 may be made with a height substantially equal to the distance between lower free edge 20 and lower face 22 of top wall 14.

When increased resistance to inadvertent turning of supplemental support 40 about the longitudinal axis of fastener 32 is desired, supplemental support 40 may be provided with an outer surface or face 44 configured for engaging with a portion of dimpled hole 24 for restricting rotation of supplemental support 40. As shown in FIG. 2, configured face 44 may be made as a rough or knurled surface.

The non-configured exterior face of support 40 may be made as a rounded surface 48, as shown. Good results have been achieved with individual flutes 46 which define fluting or fluted portion or roughened surface 44. Good results have been achieved when flutes 46 extend outwardly of rounded/relatively smooth surface 48.

In one embodiment, fifteen (15) to twenty (20) flutes were used on supplemental support 40 having a nominal diameter of 0.25 inches (6.35 mm). There may be as few as one (1) to fourteen (14) flutes 46, depending on the flute length and the intended use of the standard 4" box.

Good results have been achieved when a threaded hole 52 is provided extending at least partially through supplemental support 40. Preferably, threaded hole 52 has threads selected to mate with those of fasteners of electrical fixtures such as lights and ceiling fans. Typically, threads 52 are provided at at least a lower portion 60 of support 40.

Supplemental support 40 may be attached to box 14 by use of a powered tool driving (e.g., pressing or riveting) support 40 into hole 24.

The threads of threaded hole 52 may extend substantially the entire length through support 40, so that fasteners of various lengths for attaching a light fixture or ceiling fan, for example, may be attached to supplemental support 40 and, hence, to electrical box 10, from below during use.

It is likewise contemplated that threads 52 will only be provided at the top portion of support 40, at the bottom portion of support 40, or at both top and bottom portions with an unthreaded region in between.

Figure 4:
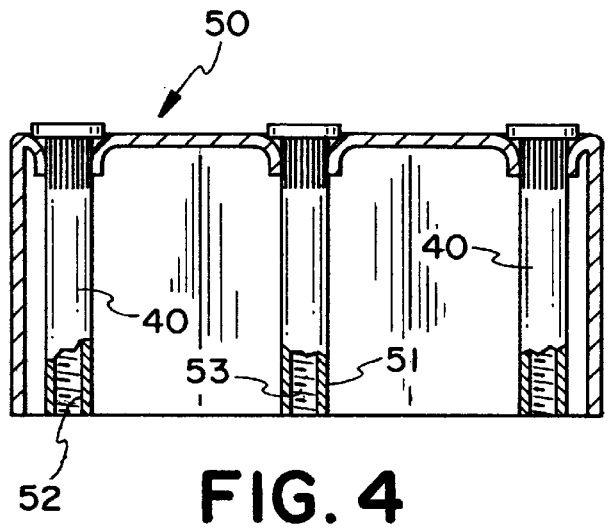
FIG. 4 is a cross-sectional view, similar to FIG. 2, of a still further preferred embodiment of a junction box according to the invention that has four (4) supplemental supports.
Figure 5:
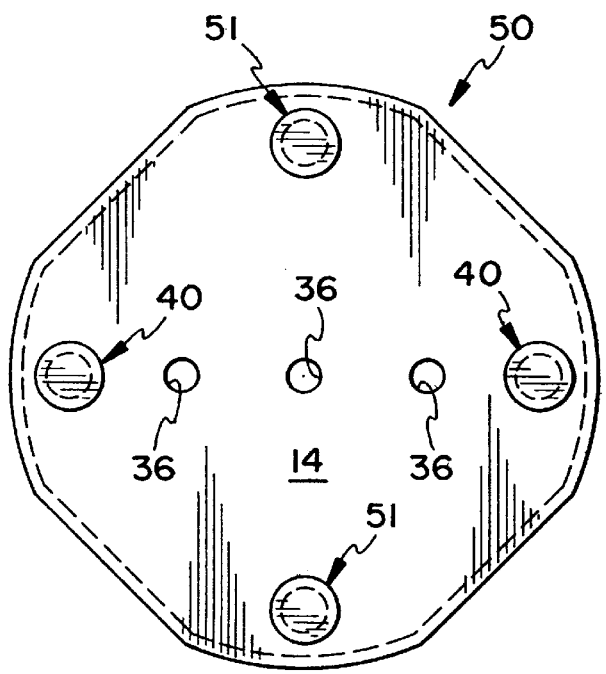
FIG. 5 is a top plan view of the box of FIG. 4.

Still further, as shown in junction box 50 of FIGS. 4 and 5, it is expected that multiple supports having different threads 52 for mating with various fasteners will be provided. For example, four (4) supports may be provided, two (2) of which are supports 40 placed on opposite sides of box 10, and the other two (2) of which are supports 51 placed on different opposed sides of box 10. Then, the one (1) pair of supports 40 is provided with threads 52, sized for mating with light fixture fasteners, and the other pair of supports 41 being provided with threads 53 of a different size than the threads of the first pair for mating with the fasteners which attach a typical ceiling fan to the lower portion of support 90 when in use.

Supports 40 and/or 51 may have a variety of external configurations as well, such as being a full, cylindrical shape with no roughened surface 44, a hexagonal supplemental support 40, a triangular supplemental support 40, and other configurations which achieve the objects of the invention.

Good results have been achieved when dimpled hole 24 has a wall 58 which extends outwardly away from top wall 14 of box 10. For example, wall 58 may extend upwardly, away from the outer surface or upper face 26 of top wall 14.

Alternatively, as shown, wall 58 may extend downwardly into cavity C. the height (i.e., downwardly extending length of wall 58) extends sufficiently into cavity C for securing support 40 sufficiently, depending on the intended use. In that manner, support 40 may be secured by top wall 14 and side wall 58, so that side wall 58 also assists in prevention of movement of support 40 that might lead to a loosening of the connection between support 40 and top wall 14, and, hence, undesirable loosening of the support 40 relative to box 10. That connection preferably should at least be sufficiently secure so that support 40 does not loosen during shipment and installation of box 10.

When two supports 40 are attached to the left and right ones of holes 36, placement of support 40 substantially adjacent side wall 18 yields the added benefit of achieving a standard center-to-center spacing between respective threads 52 of each of the two supports 40, even when using "standard" box forming equipment for making a standard box size, as discussed in greater detail below. Such also has the benefit of allowing use of standard equipment for forming holes in a sheetrock ceiling for receiving box 10, ,while maintaining the standard 3.5 inch fixture fastener offset.

It will be appreciated that there are advantages in restricting the tendency of support 40 to move within a vertical plane. Such restriction helps maintain the integrity of the initial connection between support 40 and junction box 10; e.g., the connection between both top wall 14 and support 40, and between both side wall 58 and support 40.

Still further, restricting such tendency of support 40 to rotate within a vertical plane helps to ensure that support 40 (and threads 52) extend substantially parallel to side wall 18 of junction box 10 before and during use. Needless to say, all those aspects of fine-tuning of the connection between support 40 and the remainder of junction box 10 are geared for achieving predictability of where lower portion 60 of support 40 is.

Head 64 of support 40 likewise assists in locating support 40 relative to box 10 and in restricting movement relative thereto. Head 64 may be provided with a diameter of 0.375 inches (9.525 mil) when a body 68 has a diameter of 0.25 inches (6.35 mm).

Needless to say, the disclosed connections and configurations act to restrict all movements between support 40 and the remainder of box 10. The above discussion regarding restriction of movement within a "vertical" plane is merely an example.

By restricting movement of support 40, there is achieved the desired predictability of where the lower portion of female thread 52 is located so that the desired spacing between a left hand one of supplemental support 40 and a right hand one of supplemental support 40 is achieved. Typically, the spacing between the commonly provided two (2) female threads 52 (i.e., left and right ones) attached to and extending from left and right ones of supports 40 as shown in broken-away portion of FIG. 2 will be achieved. Known light fixtures, for example, are provided with respective left and right male fasteners, three and one half (3½) inches on center, which will be mated with such left and right female threads 52, during final use of the illustrated junction boxes.

All the advantages described regarding the stabilizing of and the location of threads 52 and, hence, supplemental support 40, relative to the remainder of junction box 10 hold true for all the other preferred embodiments of the invention.

Figure 6:
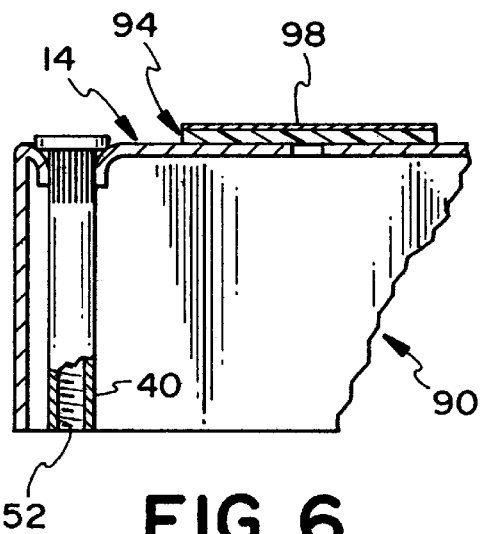
FIG. 6 is a cross-sectional view of another preferred embodiment of a junction box according to the invention.

FIG. 6 shows another preferred embodiment of a junction box 90 according to the invention.

Junction box 90 includes a piece of double-sided tape 94 on top wall 14 thereof. Double-sided tape 94 may be provided with a protective strip or layer 98 on the outer face thereof, i.e., on the face of double-sided tape 94 that has not been adhered to junction box 90. Conventional double-sided tape 94 may be used.

Alternative means for adhering junction box 90 to a surface may be used, such as spray-on adhesive, a piece of putty and other adhering means. Each of those adhering means is as described in my earlier U.S. patent application No. 08/490,757, filed Jun. 15, 1995, and No. 08/371,695, filed Jan. 12, 1995, each of which is incorporated herein by reference, and may be utilized in conjunction with or instead of the double-sided tape 94.

One of the many advantages of junction box 90 is that the user may remove protective layer 98, and then adhere double-sided tape 94 to the surface to which junction box 90 is to be attached. Double-sided tape is selected and sized so that sufficient holding power for temporarily adhering or affixing junction box 94 to the surface is achieved, while the user has both hands free for permanently attaching junction box 90 in the desired location by hammering nails (or shooting screws) through one or more holes 36.

Preferably, the adhesive is sufficiently strong to adhere box 90 to a horizontal surface located above the user's head, and for a sufficiently long period of time so that the user may release box 90 after adhering box 90 to a ceiling or wall, locate a fastener (e.g., nail or screw) and still have enough adhering time left to use both of hiss or her hands to install the fastener by hammering, screwing, or the like.

The thickness of double-sided tape 94 is coordinated with the thickness (i.e., height) of a head 64 of support 40, so head 64 of support 40 does not interfere with adherence of tape 94 to a support. Alternatively, the thickness of tape 94 is coordinated with the height of an unillustrated outwardly extending side wall 58 of dimpled hole 24 so that each performs its intended function, when junction box 90 is provided with an unillustrated outwardly extending side wall 58, for example.

In addition, it is contemplated that the thickness of tape 94 will be varied depending on the characteristics of the surface of the material to which junction box 90 is to be adhered.

Figure 7:
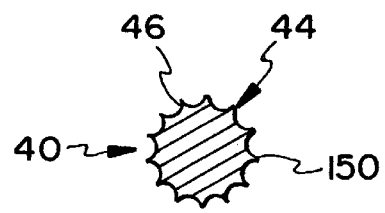
FIG. 7 is a cross-sectional view taken along line 7—7 of the support of FIG. 2.

FIG. 7 illustrates an exaggerated cross-sectional view of the extensions 150 of knurled portion 44 of support 40.

Opening or punchout 24 for receiving supports 40 and/or 51 may be constructed as described above.

During assembly of junction box 10 and/or 50, support 40 and/or 51 may be inserted through and dimpled holes 24.

The following applies to use of supports 40 and 51.

After support 40 is inserted through holes 24 then support 40 is gripped and/or compressed in a standard fashion so as to join top wall 14 and support 40.

During insertion of support 40, extensions 150 engage and cut into the sides of one or both of apertures 24 for restricting movement of support 40 after final assembly thereof. In use, junction box 40 is attached to the desired surface by inserting fasteners through holes 36. Then, the ceiling fan or light fixture is attached by use of fasteners, which will typically be provided with the ceiling fan to be attached. Such fixture fasteners are by screwing such fasteners into threaded hole 52 in the usual manner.

It is likewise contemplated that at least one washer or reinforcement plate may be provided adjacent top wall 14 and aligned with hole 24. Such a washer would include an aperture through which support 40 would extend when assembled.

FIGS. 8 and 9 illustrate a further preferred embodiment of a junction box 100 according to the invention.

Box 100 includes a dimple 108 extending downwardly from top wall 14. Dimple 108 may include internal threads 112 thereon. It is also contemplated that dimple 108 be free of threads, such as dimpled hole 24 of FIG. 2.

A fixture support 120 includes a fixture fastener 122 having a shank portion 124 substantially free of threads, and which extends through an unthreaded hole 126. Threads 128 may be provided on fixture fastener 122 for mating with threads 112 of dimple 108. FIG. 9 is an enlarged view of dimple 108.

Hole 126 may be made with threads. Typically, hole 126 will be unthreaded so that fastener shank 124 passes readily therethrough and because it is not necessary that there be threads on the portion of shank 124 adjacent a head 130 of fastener 122.

Double-sided tape 94, as described above, may be provided for temporarily adhering box 100 to a support surface, as discussed in detail regarding FIG. 6 above. Protective layer 98 is shown partially peeled away just prior to use.

It will be seen that the embodiment of FIGS. 8 and 9 have realized the object of the invention to provide a junction box having a fixture fastener which supports box 100, a fixture attached thereto, and secures both box 100 and attached fixture to a support, such as a ceiling joist.

FIG. 10 illustrates a further preferred embodiment of a junction box 150 according to the invention.

Junction box 150 includes a fixture support 120 as described above regarding FIG. 8.

A threaded hole 158 may be provided in top wall 14. The difference between box 150 of FIG. 10 and box 100 of FIG. 8 is that box 150 has no dimple.

It is likewise contemplated that hole 158 be made free of threads depending on the intended use.

The embodiment of FIG. 10 achieves that same objects as the embodiment of FIG. 8, in an even more simplified version thereof; i.e., no dimple 108 is required.

As to supplemental supports, such as the illustrated supports 40 and 51, it is likewise contemplated that such supplemental supports will have fully round cylindrical shapes, hexagonal-shapes, square shapes, shapes which are tapered at an upper portion thereof (i.e., shapes that have the appearance of truncated cones, and truncated pyramids. In addition, frustrums of pyramids and the other shapes are contemplated with truncation taken at various angles (when installed) relative to the inner face 22 of top wall 14.

Good results have been achieved when dimpled hole 24 are made in a multi-step process using a progression die.

In such case, no material is initially removed from top wall 14 by drilling or punching. Rather, a progression die is pressed into upper surface 26 of top wall 14 and then out through lower surface 22, when forming the preferred embodiment of FIG. 2, for example.

The progression die is inserted so that a first punchout or hole having a first diameter is formed, the progression die is retracted and then reinserted further so as to form a hole having a second diameter larger than the first diameter. Then, the progression die is retracted a second time, and inserted a third time, forming the desired final third diameter greater than the second diameter.

In that manner, the hole 24 can be made with the desired height of wall 58. In the present case, where the final diameter has been described as being, for example, one quarter inch in diameter to mate with the one quarter inch diameter stud or support 40, the progression die would initially form a hole having a diameter of about one-sixteenth inch, and form the second diameter with a diameter of about one-eighth inch, and then form the third and final diameter with the desired one quarter inch nominal diameter.

It will be appreciated that the progression die may be a single progression die, or a series of two or three progression dies. Depending on the intended use, it will be appreciated that material may be removed, such as by drilling and the like, prior to use of a progression die.

It is also contemplated that for intended uses where relatively large static and dynamic forces are expected, fewer knurlings/flutes each extending outwardly of support 40 generally resist such forces better than more knurlings having a shorter length extending past the remainder of stud 40 for similar applications.

In addition to or instead of the supports and/or studs used in the embodiments of FIGS. 1–10, it is expected that locking coupling nuts will be used to attach supplemental supports to the junction box, as well as any other means of fastening supplemental supports to the junction box in a sufficiently secure manner so as to achieve the objects of the invention.

It will be appreciated that these are merely examples of solutions to the problems set forth in my accompanying drawings and description, and, taken in its entirety, it will be appreciated that all the above objects of the invention, as well as many others, have been fulfilled.

It will likewise be appreciated that all the components described in the foregoing can be made of a variety of materials, such as steel, zinc, nylon, and other plastics, as the producer and user demand.

While this invention has been described as having a preferred design, it is understood that it is capable of further modification, uses and/or adaptations following in general the principle of the invention and including such departures from the present disclosures as come within known or customary practice in the art to which the invention pertains, and as may be applied to the essential features set forth, and fall within the scope of the invention or the limits of the appended claims.

I claim:

1. A mounting assembly for supporting a fixture, said mounting assembly comprising in combination:
   (a) a box including a top wall and a sidewall for defining a cavity;
   (b) at least one dimpled hole disposed in said top wall;
   (c) at least one supplemental support having a shank penetrably extending through a respective one of said dimpled holes into the cavity, each of said dimpled holes being dimensioned to grip said shank to restrain rotation of said supplemental support; and
   (d) each of said supplemental supports including means for engaging the fixture to be supported.

2. The mounting assembly as set forth in claim 1 wherein said engaging means comprises threads.

3. The mounting assembly as set forth in claim 1 wherein said engaging means comprises a threaded hole disposed at an end of said supplemental support.

4. The mounting assembly as set forth in claim 1 wherein each said shank includes knurling for engaging with the respective one of said dimpled holes.

5. The mounting assembly as set forth in claim 1 wherein at least the major portion of each of said shanks disposed within the cavity is smooth surfaced.

6. The mounting assembly as set forth in claim 1 wherein each of said supplemental supports includes a head disposed adjacent said top wall and of a size greater than the diameter of the respective one of said dimpled holes to prevent passage of said head through the respective one of said dimpled holes.

7. The mounting assembly as set forth in claim 1 wherein said top wall includes means for accommodating attachment of said mounting assembly to a surface.

8. The mounting assembly as set forth in claim 1 wherein said supplemental support includes a fluted section for frictionally engaging the respective one of said dimpled holes.

9. The mounting assembly as set forth in claim 1 including a layer of adhesive adjacent said top wall for temporarily securing said mounting assembly to a surface.

10. The mounting assembly as set forth in claim 9 wherein said a layer of adhesive includes a section of double-sided tape.

11. The mounting assembly as set forth in claim 1 including a pair of said dimpled holes disposed at opposed parts of said top wall.

12. The mounting assembly as set forth in claim 11 including a further pair of said dimpled holes disposed at opposed parts of said top wall.

13. The mounting assembly as set forth in claim 12 wherein each of said dimpled holes is in one quadrant of said top wall.

14. A mounting assembly for supporting a fixture, said mounting assembly comprising in combination:
   (a) a box including a top wall and a side wall for defining a cavity;
   (b) at least one threaded hole disposed in said top wall;
   (c) at least one apertured fixture support extending inwardly from said side wall;
   (d) at least one fixture fastener penetrably engaging one of said apertured fixture supports and into threaded engagement with one of said holes for fastening a fixture to said mounting assembly.

15. The mounting assembly as set forth in claim 14 wherein said hole is a dimpled threaded hole.

16. The mounting assembly as set forth in claim 14 wherein each of said apertured fixture supports is disposed at an edge of said side wall away from said top wall.

17. The mounting assembly as set forth in claim 14 including a pair of said threaded holes, a pair of said apertured fixture supports and a pair of said fixture fasteners for providing two locations of support for the fixture.

18. The mounting assembly as set forth in claim 17 wherein each of said threaded holes is a dimpled threaded hole.

19. The mounting assembly as set forth in claim 14 wherein each of said fixture fasteners includes a shank having a smooth surface and a threaded end for engaging the respective one of said threaded holes.

20. The mounting assembly as set forth in claim 19 wherein each of said fixture fasteners includes a head for drawing the fixture toward said mounting assembly upon threaded engagement of said fixture fastener with said threaded hole.

21. The mounting assembly as set forth in claim 14 including a layer of adhesive adjacent said top wall for temporarily securing said mounting assembly to a surface.

22. The mounting assembly as set forth in claim 21 wherein said layer of adhesive includes a section of double-sided tape.

* * * * *